US 8,837,947 B2

(12) United States Patent
Gabory

(10) Patent No.: US 8,837,947 B2
(45) Date of Patent: Sep. 16, 2014

(54) APPARATUS FOR PSEUDO-RETURN-TO-ZERO MODULATION

(75) Inventor: Emmanuel Le Taillandier De Gabory, Tokyo (JP)

(73) Assignee: Nec Corporation, Tokyo (JP)

( * ) Notice: Subject to any disclaimer, the term of this patent is extended or adjusted under 35 U.S.C. 154(b) by 91 days.

(21) Appl. No.: 13/131,965

(22) PCT Filed: Jan. 20, 2010

(86) PCT No.: PCT/JP2010/051002
§ 371 (c)(1),
(2), (4) Date: Jul. 7, 2011

(87) PCT Pub. No.: WO2011/089731
PCT Pub. Date: Jul. 28, 2011

(65) Prior Publication Data
US 2012/0320442 A1    Dec. 20, 2012

(51) Int. Cl.
*H04J 14/00*  (2006.01)
*H04L 27/20*  (2006.01)
*H04L 25/49*  (2006.01)

(52) U.S. Cl.
CPC ........ *H04L 27/2096* (2013.01); *H04L 25/4904* (2013.01)
USPC .............................. 398/77; 398/183; 398/190

(58) Field of Classification Search
USPC ............................................ 398/183–190, 77
See application file for complete search history.

(56) References Cited

U.S. PATENT DOCUMENTS

| 2002/0181088 A1* | 12/2002 | Dave et al. .................... 359/344 |
| 2003/0123592 A1* | 7/2003 | Woyciehowsky et al. .... 375/359 |
| 2004/0062470 A1* | 4/2004 | Shen et al. ...................... 385/15 |
| 2007/0070493 A1* | 3/2007 | Kim et al. ..................... 359/344 |
| 2007/0109060 A1* | 5/2007 | Lim et al. ................ 331/107 DP |
| 2008/0080859 A1 | 4/2008 | Kagawa |

FOREIGN PATENT DOCUMENTS

| CN | 1786757 A | 6/2006 |
| CN | 101155162 A | 4/2008 |
| JP | 9-230290 A | 9/1997 |
| JP | 2003-060580 A | 2/2003 |
| JP | 2003506726 A | 2/2003 |
| JP | 2004-180343 A | 6/2004 |
| JP | 2007-512748 A | 5/2007 |

OTHER PUBLICATIONS

Emmanuel Le Taillandier De Gabory, et al., "Pseudo-Return-to-Zero Modulation Scheme: Application to the Compensation of Intra-Polarization Skew for PolMux Signals", ECOC 2009, Sep. 20-24, 2009, 2 pages, Vienna, Austria.

(Continued)

*Primary Examiner* — Dzung Tran
(74) *Attorney, Agent, or Firm* — Sughrue Mion, PLLC

(57) ABSTRACT

A Pseudo-Return-to-Zero modulator is provided with a narrow pulse clock generator, a modulator driver, and an optical modulator. The narrow pulse clock generator generates a narrow pulse clock of order n, where one of levels occupies half a symbol period and the other level occupies (n−1) plus half a symbol period, n being equal to or more than two. The modulator driver generates an electrical signal in response to binary data and the narrow pulse clock. The optical modulator modulates an optical carrier in response to the electrical signal so that the modulated optical carrier is in a PRZ(n) format.

22 Claims, 17 Drawing Sheets

(56) References Cited

OTHER PUBLICATIONS

Linjie Zhou, et al., "On-Chip NRZ-to-PRZ Format Conversion Using Narrow-Band Silicon Microring Resonator-Based Notch Filters", Journal of Lightwave Technology, Jul. 1, 2008, pp. 1950-1955, vol. 26, No. 13.

G. Contestabile, et al., "All-optical clock recovery from 40 Gbit/s NRZ signal based on clock line enhancement and sharp periodic filtering", Electronic Letters, Oct. 14, 2004, 2 pages, vol. 40, No. 21.

Emmanuel Le Taillandier De Gabory, et al., "DGD Tolerance Enhancement of Optical Polarization Demultiplexing by using Pseudo-Return-to-Zero Modulation Scheme", IEICE, B-10-85, Sep. 15-18, 2009, p. 265.

Emmanuel Le Taillandier De Gabory, et al., "A Method of Accurately Optimizing the Timing of Phase Modulation in Wide Temporal Ranges for DQPSK Transmitters", OSA/OFC/NFOEC, JWA42.pdf, 2009, 3 pages.

Xiang Zhou, et al., "Cascaded two-modulus algorithm for blind polarization demultiplexing of 114-Gb/s PDM-8-QAM optical signals", OSA/OFC/NFOEC, OWG3.pdf, 2009, pp. 1-3.

M. Seimetz, et al., "Coherent RZ-8PSK Transmission at 30Gbit/s over 1200km Employing Homodyne Detection with Digital Carrier Phase Estimation", ECO 2007, 08.3.4, 2007, 2 pages.

Akihide Sano, et al., "240-Gb/s Polarization-Multiplexed 64-QAM Modulation and Blind Detection UsingPLC-LN Hybrid Integrated Modulator and Digital Coherent Receiver", ECO 2009, PDP 2.2, 2009, 2 pages.

"All-optical Clock Recovery from NRZ Data Based on Semiconductor Optical Amplifier", Photon Transaction, vol. 36, No. 7, Jul. 31, 2007, p. 1299-1301.

Communication dated Apr. 30, 2014 from the State Intellectual Property Office of P.R. China in counterpart Chinese application No. 201080061779.8.

* cited by examiner

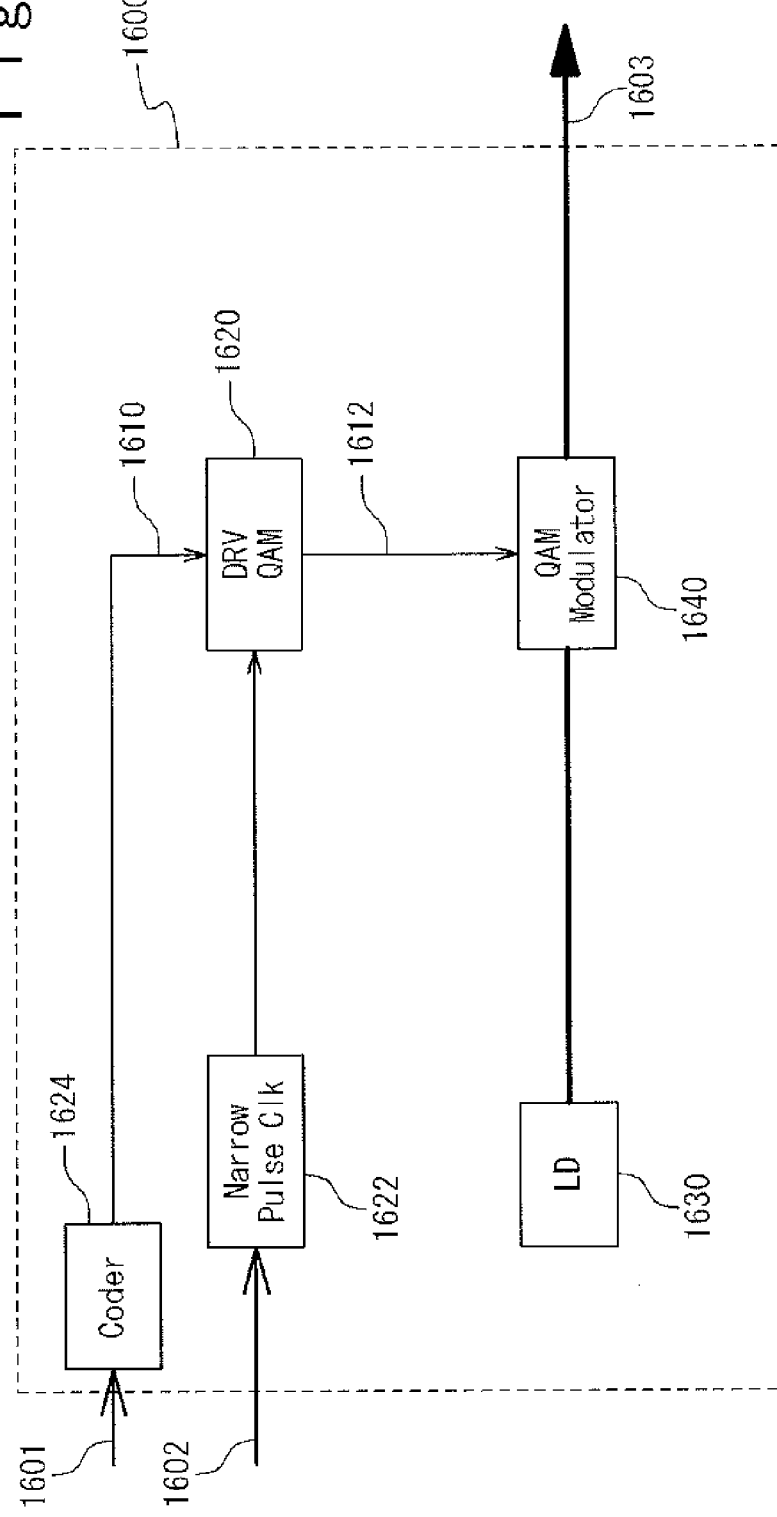

APPARATUS FOR PSEUDO-RETURN-TO-ZERO MODULATION

CROSS REFERENCE TO RELATED APPLICATION

This application is a National Stage of International Application No. PCT/JP2010/051002 filed Feb. 20, 2010, the contents of all of which are incorporated herein by reference in their entirety.

TECHNICAL FIELD

The present invention relates generally to optical communications technologies and more particularly to Pseudo-Return-to-Zero Modulation scheme.

BACKGROUND ART

Return-to-Zero (RZ) and Non-Return-to-Zero (NRZ) are widely used as the modulation name when they are implemented for On-Off Keying (OOK). In the case of OOK for optical communications, the signal is carried by a light carrier and the coding is performed as:
(a) Light is emitted during the symbol period when the coded bit is "1".
(b) No light is emitted during the symbol period when the coded bit is "0".

However, when consecutive identical bits appear, RZ and NRZ implementations are widely used:
(a) Light is temporary shut (no light emitted) between consecutive coded "1" bits: this is RZ.
(b) Light is not shut between consecutive coded "1" bits: this is NRZ.

Apparatuses for implementing the RZ modulation are disclosed in Japanese Unexamined Patent Publications No. H09-230290 and 2004-180343, for example.

In addition, RZ and NRZ can be used in conjunction with phase modulation schemes such as Binary Phase Shift Keying (BPSK), QPSK (Quaternary Phase Shift Keying), combination of Amplitude and Phase Modulation, such as 2ASK-4PSK, Quadrature Amplitude Modulation (QAM), and the like. Consecutively, if RZ is used in conjunction with the said modulation formats, the amplitude is forced to zero between consecutive symbols. In the same way, if NRZ is used with the said modulation formats, the amplitude is not forced to zero between consecutive symbols. Its value is decided according to the constellation map of the said modulation format. Note that from this point no distinction is made between Differential Phase Shift Keying (DPSK) and PSK, as the difference is only in data coding but optical signals are identical. Apparatuses for implementing the RZ-DPSK modulation are disclosed in Japanese Unexamined Patent Publications No. 2003-60580 and 2007-512748, for example.

Depending on the transmission line or condition, one may choose to implement either RZ or NRZ. On one hand, RZ is known has offering better receiver sensitivity, better tolerance to Polarization Mode Dispersion (PMD) impairments, and reduced effects of optical amplitude ripples between symbols. On the other hand, NRZ signals have narrower optical spectra, offering therefore better tolerance to filtering effects, or better tolerance to Chromatic Dispersion (CD).

Pseudo-Return-to-Zero of index n (PRZ(n)) has been introduced as the modulation scheme, where the amplitude of the lightwave signal is forced to zero every n symbols and not forced to zero for other cases. According to Le Taillandier de Gabory et al. (ECOC 2009, paper 3.4.4), PRZ enables to monitor intra-polarization skew for polarization multiplexed signals and also enables to discriminate the multiplex polarizations. Moreover, according to Le Taillandier de Gabory et al. (IEICE Society Conference 2009, paper B-10-85), PRZ enables to enhance to tolerance of optical polarization demultiplexing to first order Polarization Mode Dispersion (PMD).

According to the definition of PRZ(n), PRZ (1) can be identified as RZ and PRZ($\infty$) can be identified as NRZ. Therefore, in the scope of the present invention, we reduce PRZ(n) to the cases where n is finite and n is greater or equal to 2.

In PRZ(n) format, the amplitude returns to zero between consecutive symbols every n symbols and does not return to zero in the other cases, unless the symbol amplitude is zero or crosses zero. PRZ(n) format is not a RZ format of at a n-time slower clock frequency, as the amplitude is forced to zero and is relaxed at a very steep slope (same slope as RZ). PRZ(n) causes dips on the optical amplitude every n symbols. On the contrary, RZ format at a n time slower clock frequency would cause a n-time slower slope when the amplitude is forced to zero and would cause degradation of the quality of the transmission as the central part of symbols are affected by the slow slope of the amplitude change. Therefore, RZ at an n-time slower clock speed cannot be used as a substitute to PRZ(n).

A proposed way to generate PRZ(n) carving is to use the transitions of a PSK modulator between consecutive trains of n identical symbols. This configuration implies some disadvantages.

First, an additional optical modulator is needed to carve PRZ dips. Moreover, the additional modulator will require also Auto Bias Control (ABC) circuit in order to avoid drift of the bias point, and therefore degradation of the signal quality because of thermal drift or device aging. Therefore, such a scheme will increase both the size and the cost of an optical transmitter implementing PRZ carving.

Second, the additional optical modulator used to carve PRZ dips causes loss to the optical signal. Typically, the insertion loss is in the order of 6 dB. This causes, de facto a loss in optical signal to noise ratio of the emitter, and therefore this affects the quality of the emitted signal. One may want to compensate this loss by using a light source laser with a higher power for the output signal. If such a laser is available, its power consumption will be higher.

Third, the optical modulator used to imprint the data onto the optical carrier and the optical modulator used to cave PRZ dips will be separated by optical fiber. As the refractive index and length of the optical fiber changes with temperature, the synchronicity of both said modulator will be affected by temperature drifts, and therefore the quality of the emitted signal will suffer from temperature changes.

Fourth, integrated modulators for dual polarization (DP) are bound to be a cost effective solution, as encouraged by the standardization activities of the Optical I. Forum (OIF). However, as PSK modulators have a strong polarization dependent loss (PDL), the effective only solution to use a PSK modulator in conjunction with a DP modulator to carve PRZ dips, is to place the PSK modulator before the PRZ modulator. In that configuration, both polarizations will have the same PRZ carving at the same index. In that case, polarization discrimination based on the PRZ dips is no longer possible.

Fifth, in the case of high index n for the PRZ carving, typically when n is equal or greater than 8, carving PRZ (n) dips with a PSK modulator requires a wide and flat bandwidth characteristics for the modulator, as the transmission contains at the same time low frequency components, the long trains of constant amplitude occurring during the n constant symbol trains, and high frequency components, the PSK modulation transmission, by which the dips are curved occurring at the transition between opposite trains of n symbols. However, for 100 G PRZ-DP-QPSK, the baud rate is 25 Gbaud and in such case the PRZ carving may cause degradation on the emitted signal when n is in the order of 8 with standard PSK modulators. Imposing a tighter specification on the flatness or bandwidth of the modulator leads to an increase in cost.

Moreover, one could think of using a high speed Digital to Analog Converter (DAC) in order to control precisely the position of the emitted light signal on the constellation map, when the light signal is modulated by a Cartesian modulator; in order to carve PRZ dips in this manner, one would need to generate a signal coding the modulated symbol and the transition between symbols at the same time. This means that at least two values have to be generated by symbol, requiring a DAC operating for at least twice the baud rate. However, in the case of 100 Gb/s DP-QPSK modulation format, the baud rate is 25 Gbaud, therefore one would require at least a 50 Gb/s DAC to control at the same time the emitted symbol and the transition on the constellation map. These devices are not commercially available at this point, and when they will be, they will be at a high price and consume a high amount of electrical power.

However, there is room for improvement in simplicity, size, cost, emitted signal power, stability and functionality of PRZ carving apparatuses. There is a need for a simple, small-sized, cost effective, low loss, stable and versatile PRZ carving apparatus.

CITATION LIST

Patent Literature
Japanese Unexamined Patent Publication No. H09-230290
Japanese Unexamined Patent Publication No. 2004-180343
Japanese Unexamined Patent Publication No. 2003-60580
Japanese Unexamined Patent Publication No. 2007-512748
Non-Patent Literature Le Taillandier de Gabory et al., "Pseudo-Return-to-Zero Modulation Scheme: Application to the Compensation of Intra-Polarization Skew for PolMux Signals", ECOC 2009, paper 3.4.4.

Le Taillandier de Gabory et al., "DGD Tolerance Enhancement of Optical Polarization Demultiplexing by using Pseudo-Return-to-Zero Modulation Scheme", IEICE Society Conference 2009, paper B-10-85.

Le Taillandier de Gabory et al., "A Method of Accurately Optimizing the Timing of Phase Modulation in Wide Temporal Ranges for DQPSK Transmitters", OFC 2009, paper JWA42.

Seimetz et al., "Coherent RZ-8PSK Transmission at 30 Gbit/s over 1200 km Employing Homodyne Detection with Digital Carrier Phase Estimation", ECOC 2007, paper 08.3.4.

Zhou et al., "Cascaded two-modulus algorithm for blind polarization demultiplexing of 114-Gb/s PDM-8-QAM optical signals", OFC 2009, paper OWG3.

Sano et al., "240-Gb/s Polarization-Multiplexed 64-QAM Modulation and Blind Detection Using PLC-LN Hybrid Integrated Modulator and Digital Coherent Receiver", ECOC 2009, paper PDP 2.2.

SUMMARY OF THE INVENTION

A Pseudo-Return-to-Zero modulator is provided with a narrow pulse clock generator, a modulator driver, and an optical modulator. The narrow pulse clock generator generates a narrow pulse clock of order n, where n is equal to or more than two and one of levels occupies half a symbol period and the other level occupies (n−1) plus half a symbol period. The modulator driver generates an electrical signal in response to binary data and the narrow pulse clock. The optical modulator modulates an optical carrier in response to the electrical signal so that the modulated optical carrier is in a PRZ(n) format.

BRIEF DESCRIPTION OF DRAWINGS

FIG. 16 is a schematic representation of an exemplary configuration of a transponder emitting PRZ(n) carved signal according to the present invention.

DESCRIPTION OF EMBODIMENTS

In one exemplary embodiment, a modulator driver is provided which receives binary data and feeds an electrical signal to an optical modulator, so that the optical carrier will be modulated according to the binary data and PRZ(n) carving will be performed on the optical carrier. The modulator driver generates an electrical signal according to the provided data and clock signals. The electrical signal is fed to the optical modulator. The light signal modulated by the modulator will carry the information of the binary data and will have dips carved according to PRZ(n) carved on the optical amplitude.

In one exemplary embodiment, the optical modulator is an intensity modulator and the modulation format is OOK. The modulator driver generates an electrical signal according to the provided data and clock signals. Said electrical signal is fed to the intensity modulator to emit a PRZ(n)-OOK signal.

In another exemplary embodiment, the optical modulator is a PSK modulator and the modulation format is BPSK. The modulator driver generates an electrical signal according to the provided data and clock signals. Said electrical signal is fed to the PSK modulator to emit a PRZ(n)-BPSK signal.

In still another exemplary embodiment, the optical modulator is a PSK modulator, and is followed by other phase modulators. An example of this modulation scheme is given by Le Taillandier de Gabory et al. (OFC 2009, paper JWA42), where a PSK modulator is followed by a phase modulator to generate a QPSK signal in a serial modulation scheme. The modulator driver generates an electrical signal according to the provided data and clock signals. The electrical signal is fed to the PSK modulator. The PSK modulator modulates the light according to PRZ(n)-BPSK format and the modulation format at the output of the last modulator is PRZ(n)-xPSK, where x is equal or greater than 4.

Figure 11:
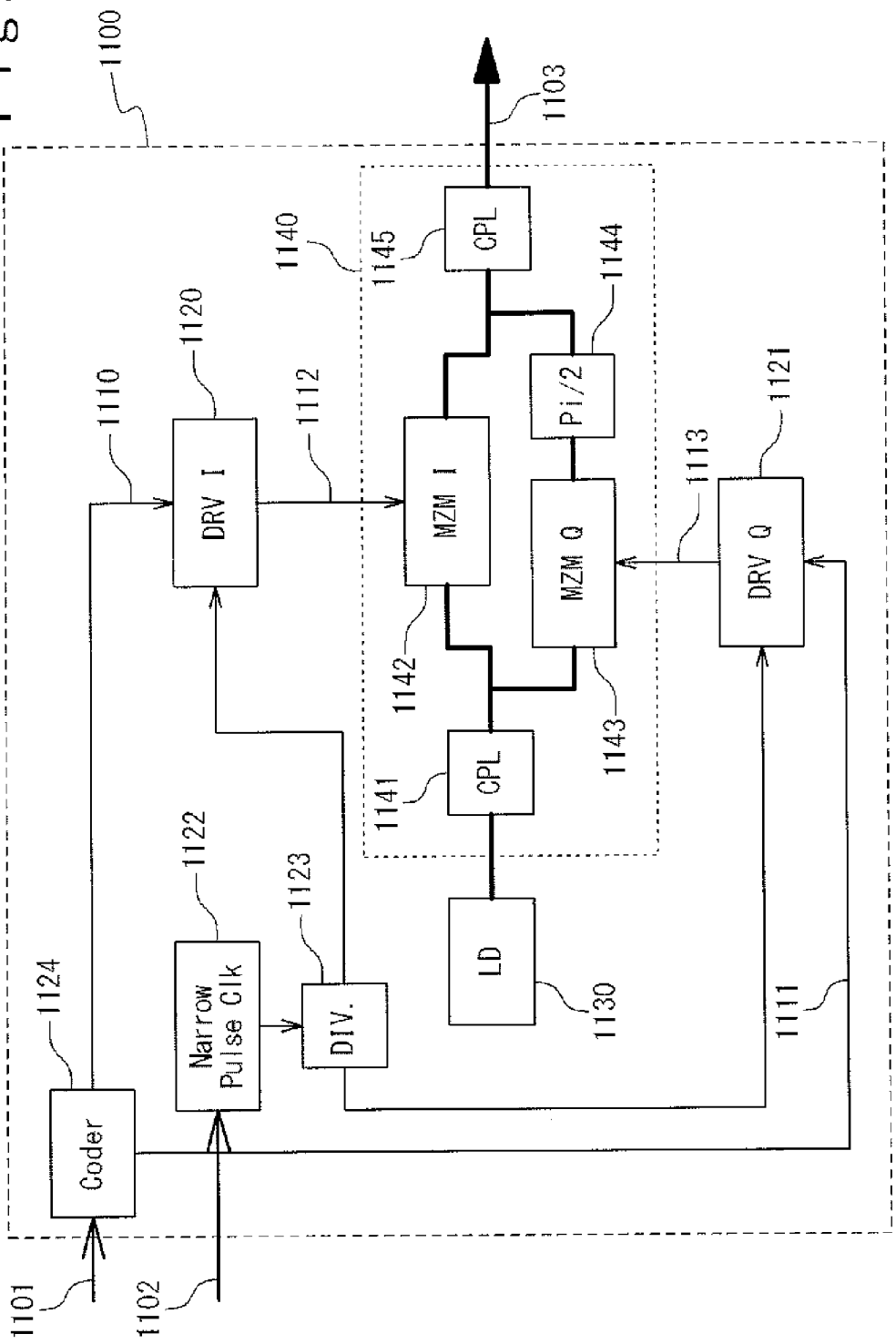
FIG. 11 is a schematic representation of an exemplary configuration of a QPSK transmitter emitting PRZ(n)-QPSK modulated signal according to the present invention.

In still another exemplary embodiment, the optical modulator is a Cartesian modulator and the modulation format is QPSK (See FIG. 11). Two modulator drivers are used; one receives the In Phase (I) data and the other receives the Quadrature Phase (Q) data for the QPSK modulation. Both modulator drivers receive the same clock at the baud rate. The modulator driver receiving the I data generates an electrical signal according to the provided data and clock signals. The electrical signal is fed to the nested modulator corresponding to the I arm of the Cartesian modulator. In the same way, the modulator driver receiving the Q data generates an electrical signal according to the provided data and clock signals. The electrical signal is fed to the nested modulator corresponding to the Q arm of the Cartesian modulator to emit a PRZ(n)-QPSK signal from the Cartesian modulator.

In still another exemplary embodiment, the optical modulator is a Cartesian modulator, followed by other phase modulations. An example of this modulation scheme is given by Seimetz et al. (ECOC 2007, paper 08.3.4), where a QPSK Cartesian modulator is followed by a phase modulator to generate an 8PSK signal in a serial modulation scheme. Another example is given by Zhou et al. (OFC 2009, paper OWG3) where a Cartesian modulator is followed by a phase modulator to generate an 8QAM signal in a serial modulation scheme. Two modulator drivers are used to generate the I data and Q data of the Cartesian modulator. The Cartesian modulator generates a signal modulated according to the I and Q data provided to the modulator drivers and having PRZ(n) dips carved. The modulation format at the output of the last modulator is PRZ(n)-xPSK. In still another exemplary embodiment, the modulation format at the output of the last modulator is PRZ (n)-xQAM.

In still another exemplary embodiment, the optical modulator is an xQAM modulator consisting in several nested Cartesian QPSK modulators. An example is given by Sano et al. (ECOC 2009, paper PDP 2.2), where 64QAM signal is generated in this way. Each nested Cartesian modulator has two modulator drivers, one for the I data and one for the Q data. The lightwave signal is modulated as PRZ(n)-xQAM by the modulator.

In one exemplary embodiment, the optical modulator is dual driven. The modulator driver generates an electrical signal for the positive input and one signal for the negative input of the dual drive modulator. The optical signal emitted by the modulator has PRZ(n) dips carved on the optical amplitude.

In an alternative exemplary embodiment, the optical modulator is single driven. The modulator driver generates a single electrical signal to be fed to the modulator. The optical signal after the modulator has PRZ(n) dips carved on the optical amplitude.

In one exemplary embodiment, the modulator driver generates an electrical signal so that the optical signal emitted by the optical modulator is modulated according to the data provided to the modulator driver and so that the optical amplitude is forced to zero every n symbol, carving therefore PRZ (n) dips.

In an alternative exemplary embodiment, the modulator driver generates an electrical signal so that the optical signal emitted by the optical modulator is modulated according to the data provided to the modulator driver and so that the optical amplitude is forced to pass by the zero point every n symbol, carving therefore PRZ (n) symbols.

In the following, exemplary embodiments of the present invention will be described below in detail with reference to attached drawings.

Figure 1A:
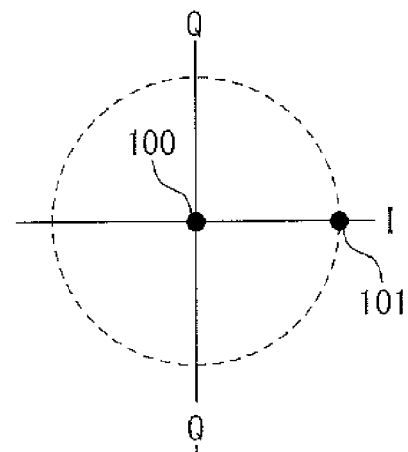
FIGS. 1A to 1D are constellation maps of OOK, BPSK, QPSK and 8PSK, respectively.

FIGS. 1A to 1D are constellation maps for different modulation formats. FIG. 1A is the constellation map of OOK, where the numeral 100 denotes the "0" symbol and the numeral 101 denotes the "1" symbol of OOK.

Figure 1B:
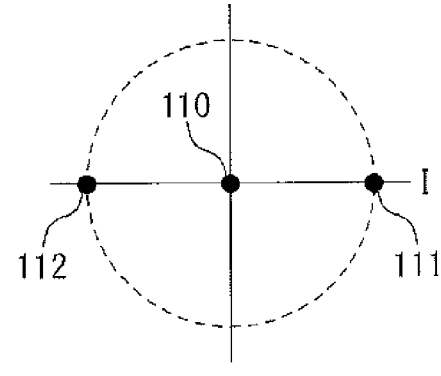

FIG. 1B is the constellation map of BPSK, where the numeral 110 denotes the null point, where the optical amplitude is zero, the numeral 111 denotes the "1" symbol and the numeral 112 denotes the "0" symbol. When generated from a Mach-Zehnder modulator, a transition from the "1" symbol 111 to the "0" symbol 112 passes through zero. Therefore, whereas the "1" symbol 111 and "0" symbol 112 have the same optical amplitude, any inversion of the data induces a pass through the null point 110.

Figure 1C:
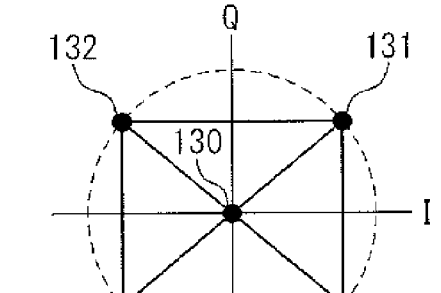

FIG. 1C is the constellation map of QPSK, where the numeral 130 denotes the null point and the numerals 131, 132, 133 and 134 denote the four different phases, which codes two binary bits onto a symbol. All symbols have the same optical amplitude; however, a transition between symbols can induce three different amplitude levels. Namely, in the case where the constellation map is generated by a Cartesian modulator, composed of two nested QPSK modulators, the transitions between two symbols are as follows: when the phase is constant between two symbols, the optical amplitude stays constant at the transition; when the phase changes by pi radians, the signal crosses the null point 130, which causes the transition between symbols to have a null amplitude; when the phase between symbols changes by pi/2 radians, the amplitude is in a medium amplitude state, lowering from the amplitude at the symbol center, but still being higher than 0.

Figure 1D:
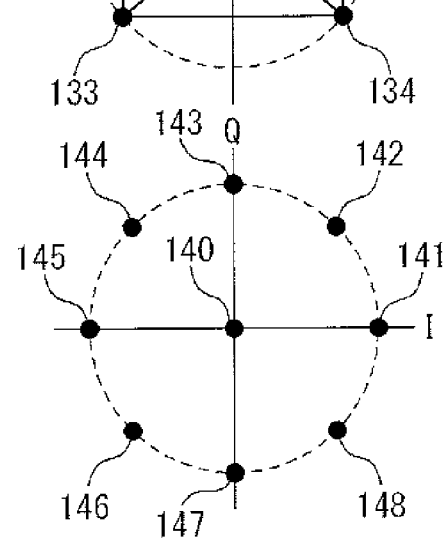
Figure 2A:
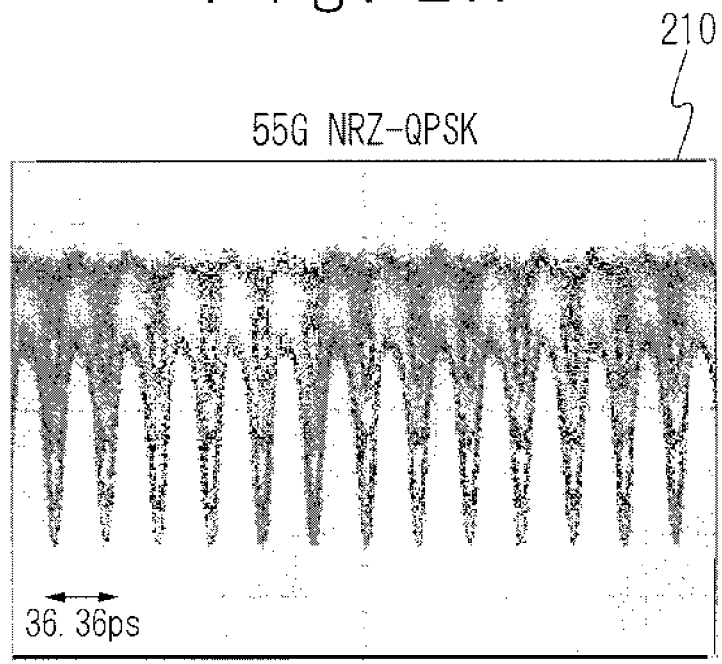
FIG. 2A is an eye diagram for an NRZ signal.
Figure 2B:
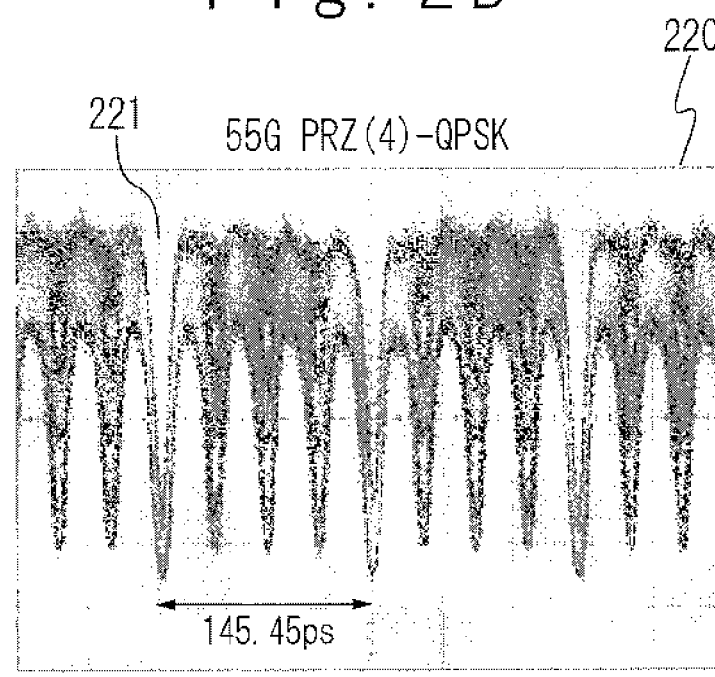
FIGS. 2B to 2D are eye diagrams for PRZ signals.
Figure 2C:
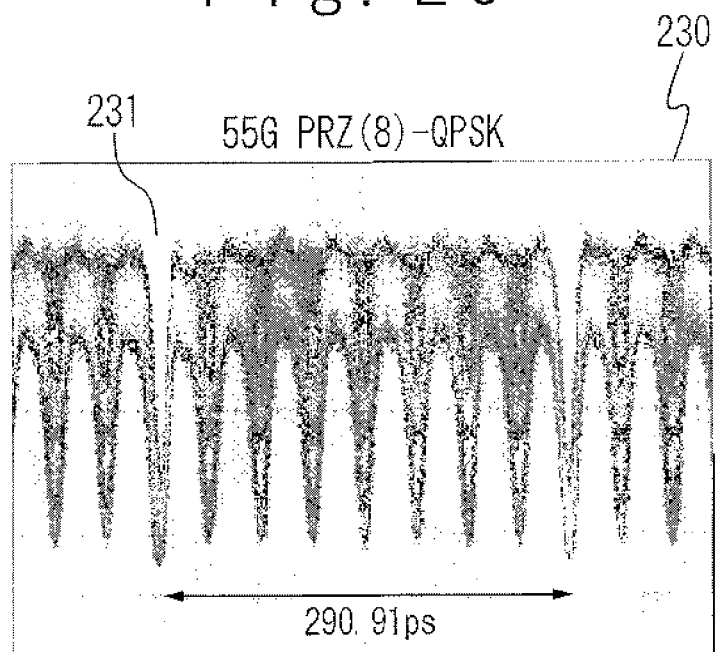
Figure 2D:
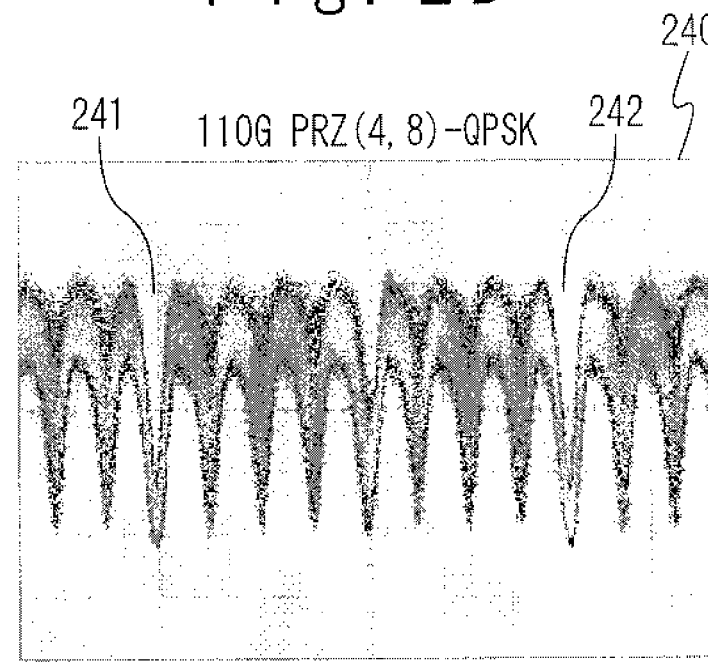

FIG. 1D is the constellation map of 8PSK modulation, where the numeral 140 denotes the null point and the numerals 141 to 148 denote the eight phases which code three binary bits of data on each symbol.

FIGS. 2A to 2D are eye diagrams representing the optical amplitude on 14 symbol periods. The diagram 210 is a measurement of an eye diagram for a 55 GB/s NRZ-QPSK signal, where the QPSK modulation was generated with a Cartesian modulator. The symbol period is 36.36 ps. Between every two symbols, the three possible amplitude levels correspond to the three possible amplitudes for transitions between coded phases described with the constellation of FIG. 1D.

The diagram 220 is a measurement of an eye diagram for a 55 Gb/s PRZ(4)-QPSK signal, where the QPSK modulation is identical to the one on the diagram 210. The numeral 221 denotes a PRZ(4) dip, which appear every four symbols for PRZ(4), therefore every 145.45 ps.

The diagram 230 is a measurement of an eye diagram for a 55 Gb/s PRZ(8)-QPSK signal, where the QPSK modulation is identical to the one on the diagram 210. The numeral 231 denotes a PRZ(8) dip, which appear every eight symbols for PRZ(8), therefore every 290.91 ps.

The diagram 240 is a measurement of an eye diagram of 110 Gb/s PRZ(4,8)-DP-QPSK, which is the polarization multiplexed signal of the signals measured on the diagrams 220 and 230, where the symbol of the signals and the PRZ dips are synchronous. The numeral 241 denotes the peaks of PRZ(8), which are synchronous with half of the dips of PRZ(4). The numeral 242 denotes the other half of the dips of PRZ(4), which are not synchronous to the PRZ(8) dips, therefore synchronous with a standard three possible level QPSK transition.

Figure 3:
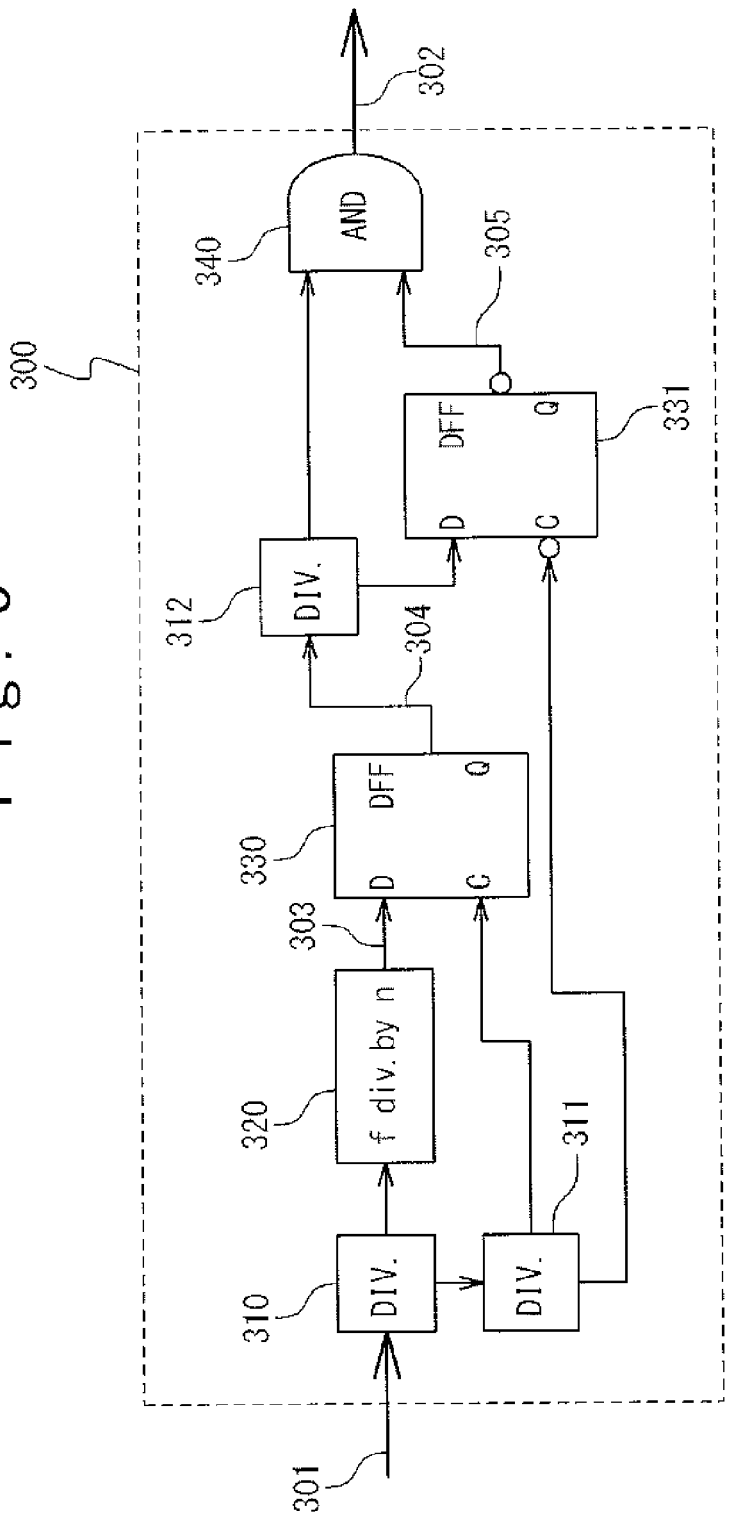
FIG. 3 is a schematic representation of a narrow pulse clock generator generating a narrow pulse clock signal.

FIG. 3 is a schematic representation of a narrow pulse clock generator used to generate a narrow pulse clock. We call a narrow pulse clock of order n, where one of the levels occupies half a symbol period and the other level occupies (n−1) plus half a symbol period. The period of the narrow pulse clock of order n is n times the symbol period. With this definition, a narrow pulse clock of order 1 is a 50% duty cycle clock. Therefore, from here on, we consider only a narrow pulse clock of finite order n, where n is greater or equal to 2.

The narrow pulse clock generator 300 receives an electrical signal 301 which is a standard 50% duty clock of frequency f. The electrical signal 301 is divided twice by dividers 310 and 311. One of the resultant tributaries is divided in frequency by n, by a frequency divider 320. Therefore, the electrical signal 303 is a 50% duty cycle clock at the frequency f/n. The electrical signal 303 is fed to the D input of a D flip-flop (DFF) 330, and the clock at f is fed to the clock input. The output signal Q of the D flip-flop 330, which is denoted by the numeral 304, is divided by a divider 312. One resultant tributary is fed to the D input of a D flip-flop 331. The clock signal at f is also fed into the inverted clock input of the D flip-flop 331. The other output of the divider 312 is fed to a logical AND circuit 340. The other input of the logical AND circuit 340 is connected to the inverted output Q, which is denoted by the numeral 305, of the D flip-flop 331. The relative phases of the D flip-flops 330, 331 and the AND circuit 340 are adjusted so that the output 302 of the AND circuit 340 is a narrow pulse clock of order n, as illustrated on FIG. 4. The narrow pulse clock generator 300 transforms the input clock at the frequency f into an output narrow pulse clock of order n.

Figure 4:
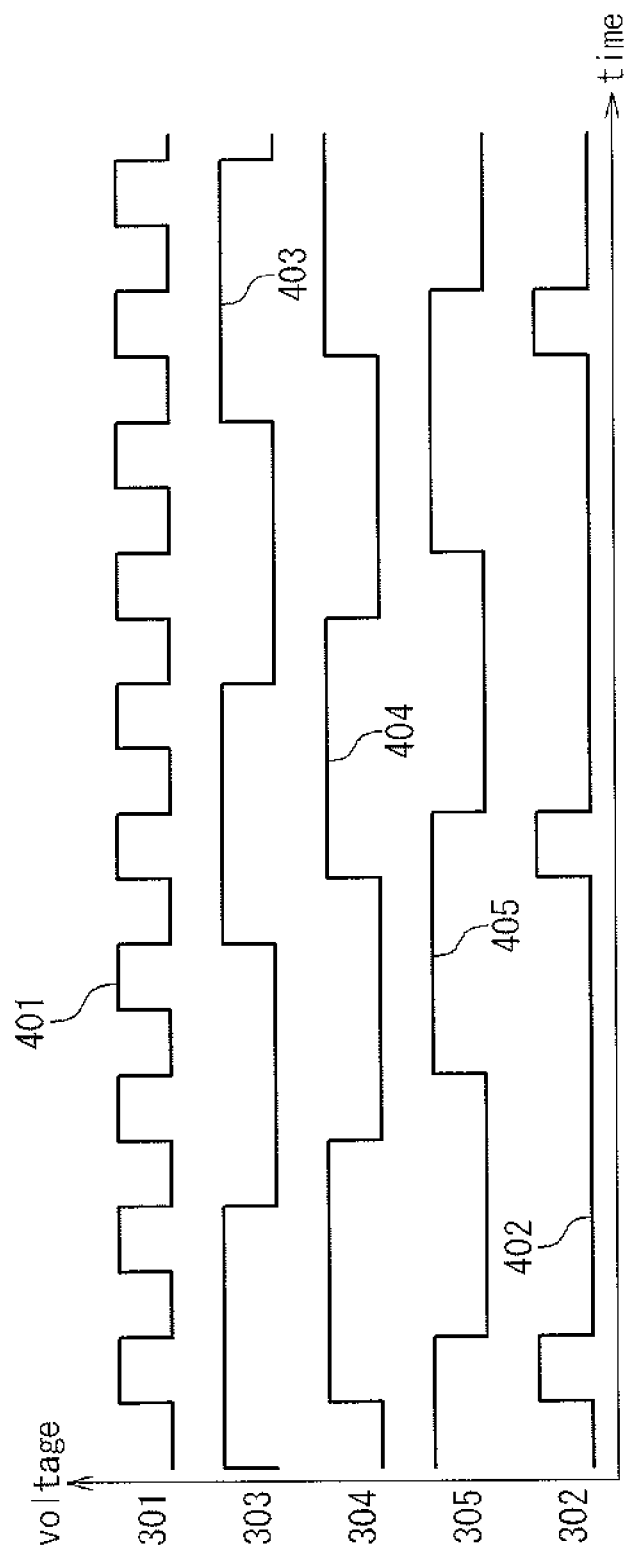
FIG. 4 is a representation of the time charts of the apparatus of FIG. 3.

FIG. 4 is a time chart of signals of the schematic representation depicted on FIG. 3, where n is taken as n=4. The signals 401, 402, 403, 404 and 405 are the respective time charts of the signals 301, 302, 303, 304 and 305 of FIG. 3.

The numeral 401 denotes a clock at the frequency f. The numeral 403 denotes a clock at the frequency f/4. The numeral 404 is another clock at f/4, which is shifted by half a period of f (2/f) from the clock 403. The numeral 405 denotes another clock at f/4, which is shifted by 8/f from 403. The output signal 402 is a narrow pulse clock of order 4, generated by the narrow pulse clock generator 300 when n=4.

Figure 5:
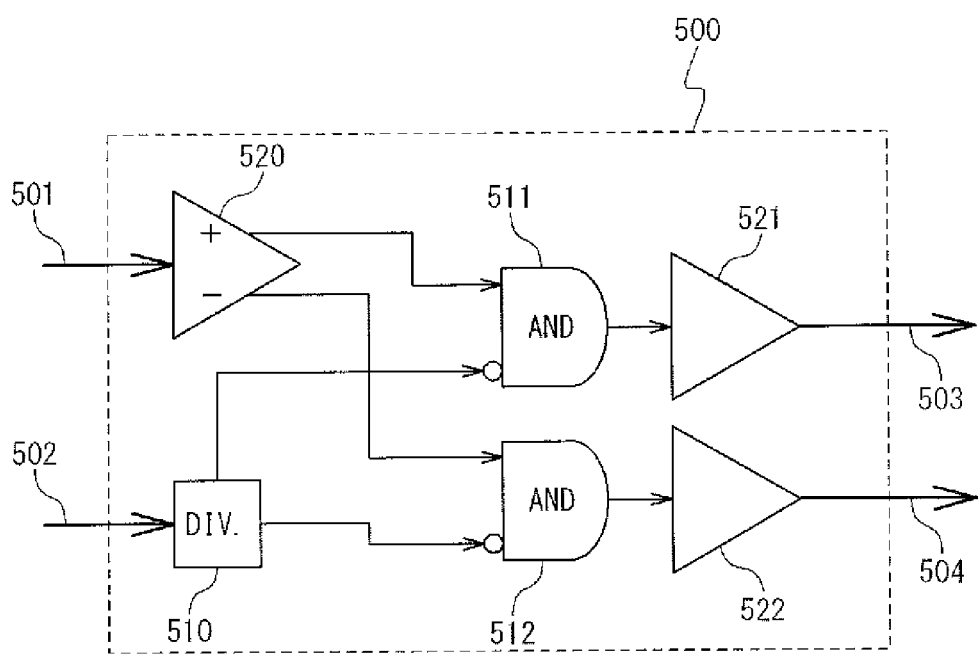
FIG. 5 is a schematic representation of a modulator driver generating signals to drive a modulator carving PRZ dips on an optical carrier and modulating it.

FIG. 5 is the schematic representation of a modulator driver 500, which generates two electrical signals 503 and 504 used to drive a modulator, to modulate an optical signal passing through the modulator according to a signal binary data 501 and to carve PRZ(n) dips on the optical signal according to a narrow pulse clock of order n, which is denoted by the numeral 502.

The modulator driver 500 has two inputs receiving the binary data signal 501 and the narrow pulse clock 502. The binary data signal 501 carries binary data according to which an optical signal will be modulated. The narrow pulse clock 502 may be generated by the narrow pulse clock generator 300 shown in FIG. 3. The numeral 520 denotes a differential amplifier which amplifies the binary data signal 501. The non inverted output of the differential amplifier 520 is fed to one input of a logical AND circuit 511. The inverted output of the differential amplifier 520 is fed to one input of a logical AND circuit 512. The narrow pulse clock 502 is divided by the divider 510. One output of 510 is fed into the other input of the AND circuit 511, which is inverted. The other output of the divider 510 is fed into the other input of the AND circuit 512, which is also inverted. The outputs of the respective AND circuits 511 and 512 are respectively connected to amplifiers 521 and 522, which amplify their respective levels. The respective outputs 503 and 504 of the AND circuits 521 and 522 have suitable amplitudes to drive an optical modulator.

Figure 6:
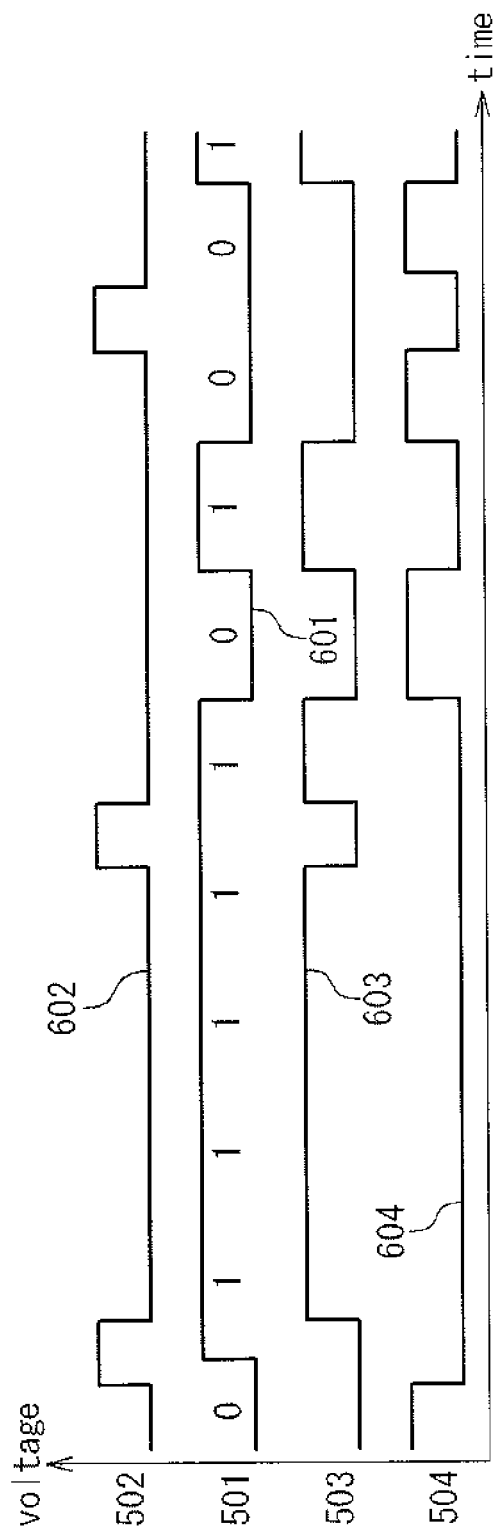
FIG. 6 is a representation of the time charts of the modulator driver of FIG. 5.

FIG. 6 is a time chart of the signals of the schematic representation depicted on FIG. 5, where the numeral 502 denotes a narrow pulse clock of order 4 and the data carried by the binary data signal 501 is the following bit sequence: 0,1,1,1,1,1,0,1,0,0,1. The signals 601, 602, 603, and 604 are the respective time charts of the signals 501, 502, 503 and 504 of FIG. 5.

The signals 603 and 604 are electrical signals generated to drive a modulator carving PRZ(4) dips on the optical amplitude of the modulated signal according to the binary data signal 601.

Figure 7:
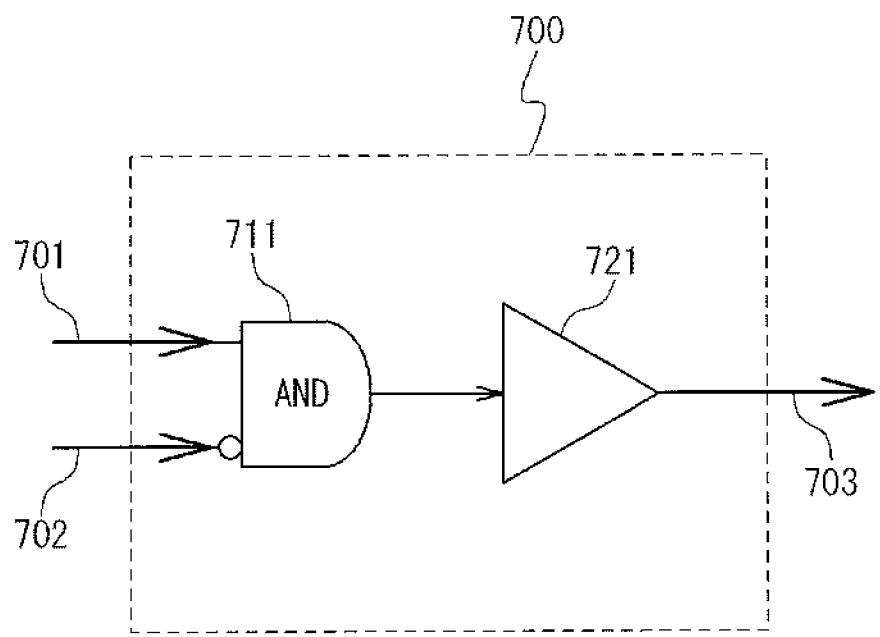
FIG. 7 is a schematic representation of another modulator driver generating signals to drive a modulator carving PRZ dips on an optical carrier and modulating it.

FIG. 7 is a schematic representation of a differently-configured modulator driver 700, which generates one electrical signal 703 used to drive a modulator, to modulate the optical signal passing through the modulator according to a binary data signal 701 and to carve PRZ(n) dips on the optical signal according to a narrow pulse clock of order n, which is denoted by the numeral 702.

The modulator driver 700 has two inputs receiving the binary data signal 701 and the narrow pulse clock 702. The binary data signal 701 carries binary data according to which an optical signal will be modulated. The narrow pulse clock 702 may be generated by the narrow pulse clock generator 300 shown in FIG. 3. The binary data signal 701 is fed to one input of a logical AND circuit 711. The narrow pulse clock 702 is fed to the other input of the AND circuit 711, which is inverted. The output of the AND circuit 711 is connected to an amplifier 721, which amplify the level. The output 703 of the amplifier 721 has a suitable amplitude to drive an optical modulator.

Figure 8:
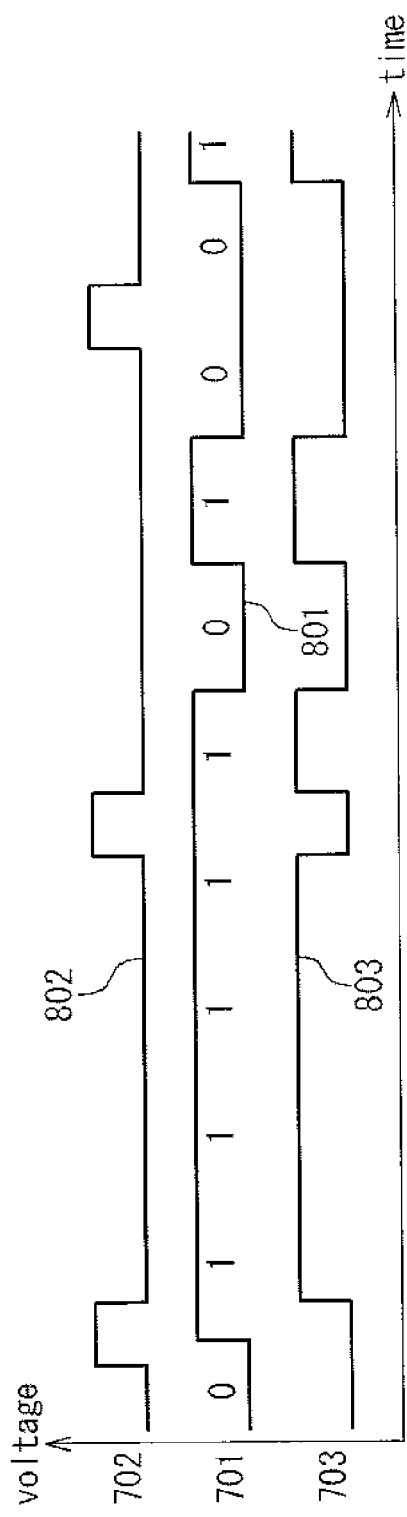
FIG. 8 is a representation of the time chart of the modulator driver of FIG. 7.

FIG. 8 is a time chart of signals of the schematic representation depicted on FIG. 7, where the narrow pulse clock 702 is a narrow pulse clock of order 4 and the binary data signal 701 carries data of the following bit sequence: 0,1,1,1,1,1,0, 1,0,0,1. The signals 801, 802, and 803 are the respective time charts of the signals 701, 702, and 703 of FIG. 7. The numeral 803 denotes an electrical signal generated to drive a modulator carving PRZ(4) dips on the optical amplitude of the modulated signal according to the binary data signal 801.

Figure 9:
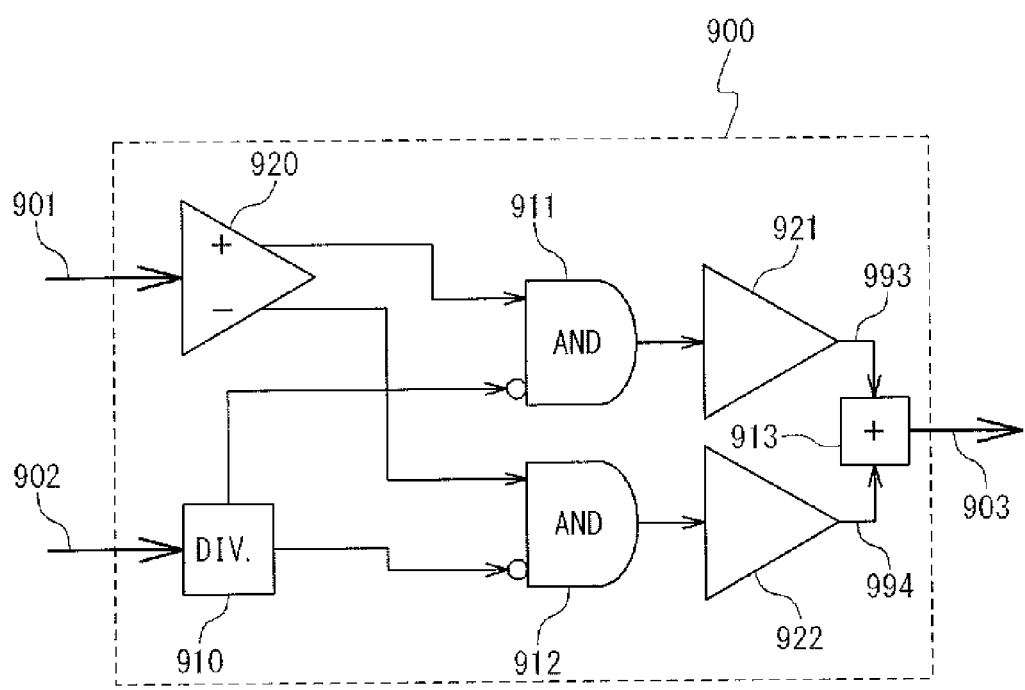
FIG. 9 is a schematic representation of another modulator driver generating signals to drive a modulator carving PRZ dips on an optical carrier and modulating it.

FIG. 9 is a schematic representation of a differently-configured modulator driver 900, which generates one electrical signal 903 used to drive a modulator, to modulate the optical signal passing through the modulator according to a binary data signal 901 and to carve PRZ(n) dips on the optical signal according to a narrow pulse clock of order n, which is denoted by the numeral 902.

The modulator driver 900 has two inputs receiving the binary data signal 901 and the narrow pulse clock 902. The binary data signal 901 carries binary data according to which an optical signal will be modulated. The narrow pulse clock 902 may be generated by the narrow pulse clock generator 300 shown in FIG. 3. A divider 910, AND circuits 911, 912, amplifiers 920, 921 and 922 are identical respectively to the divider 510, the AND circuits 511, 512, and the amplifiers 520, 521 and 522 on FIG. 5. The output 993 of the amplifier

921 and the inverted output 994 of the amplifier 922 are summed by an adder circuit 913. For impedance reason, the amplifiers 921, 922 and the adder circuit 913 are integrated. The output 903 of the adder circuit 913 has a suitable voltage to drive an optical modulator.

Figure 10:
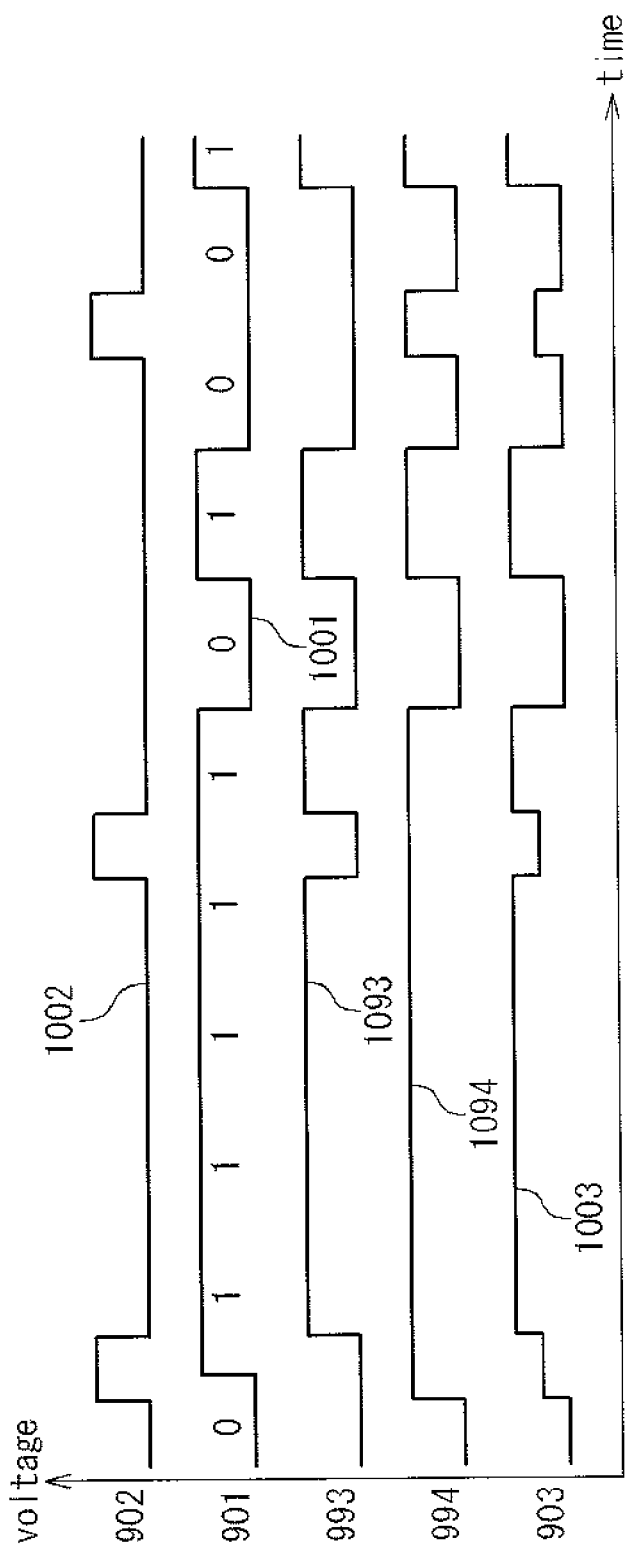
FIG. 10 is a representation of the time chart of the modulator driver of FIG. 9.

FIG. 10 is a time chart of signals of the schematic representation depicted on FIG. 9, where the narrow pulse clock 902 is a narrow pulse clock of order 4 and the binary data signal 901 carries the following bit sequence: 0,1,1,1,1,1,0, 1,0,0,1. The signals 1001, 1002, 1003, 1093 and 1094 are the respective time charts of the signals 901, 902, 903, 993 and 994 of FIG. 9.

The numeral 1003 denotes an electrical signal generated to drive a modulator carving PRZ(4) dips on the optical amplitude of the modulated signal according to the binary data signal 1001.

In one exemplary embodiment, the present invention is incorporated in an optical transmitter shown in FIG. 11. The transmitter 1100 is a PRZ(n)-QPSK transmitter according to the present invention. The transmitter 1100 receives binary data 1101 on one input and a clock 1102 at the baud rate on another input. The numeral 1103 denotes an optical carrier, on which QPSK data has been modulated according to the binary data 1101. The numeral 1124 denotes a coder which generates two binary data sequences from the binary data 1101, in order to modulate the optical carrier 1103 with QPSK format. The numeral 1110 denotes the I data and the numeral 1111 denotes the Q data. The clock 1102 is fed to a narrow pulse clock generator 1122, which is identical to the narrow pulse clock generator 300 shown in FIG. 3.

The output of the narrow pulse clock generator 1122 is a narrow pulse clock of order n, which is divided at a divider 1123. The outputs of the divider 1123 are connected to modulator drivers 1120 and 1121, which are identical to the modulator driver 500 shown in FIG. 5. The modulator drivers 1120 and 1121 respectively generate sets of dual electrical signals 1112 and 1113, each set being equivalent to the electrical signals 503 and 504 on FIG. 5. A laser diode 1130 is provided to generate a continuous wave (CW) optical carrier, modulated by a Cartesian modulator 1140, which includes nested Mach-Zehnder modulators (MZM) 1142 and 1143, with couples 1141 and 1145 as well as a additional pi/2 radian phase shift 1144. The Mach-Zehnder modulators 1142 and 1143 are both dual drive so that the sets of dual signals 1112 and 1113 drive the modulators in a dual driving scheme. The optical carrier 1103 is modulated in a QPSK format according to the binary data 1101 and the amplitude thereof has PRZ (n) dips carved.

Now an example of operation of the transmitter 1100 is given. In one embodiment, the bit rate of the transmitter 1100 is 56 GB/s, so that the baud rate is 28 Gb/s. The data rate of the binary data 1101 is 56 Gb/s and the frequency of the clock 1102 is 28 GHz. The binary data sequences 1110 and 1111 are respectively the I data and Q data, at 28 GB/s. The narrow pulse clock generator 1122 generates a narrow pulse clock of order 4, as illustrated in FIG. 4. The electrical signal sets 1112 and 1113 are two set of dual electrical signals at 28 Gb/s each, as illustrated in FIG. 6. Each of the nested Mach-Zehnder modulators 1142 and 1143 generates a constellation map identical to FIG. 1B. For the Mach-Zehnder modulator 1142, at the symbol center, the dual driving signals 1112 are opposites, so that according to the I data 1110, the light modulated by the Mach-Zehnder modulator 1142 is either the "0" signal 111 or "1" signal 112 in FIG. 1B.

For transitions between the symbols, when the narrow pulse clock is high, the dual driving signals 1112 are equal, so that the light modulated by the Mach-Zehnder modulator 1143 is on the null point 110. For transitions other than the ones when the narrow pulse clock is high, the amplitude is not forced to null. The Mach-Zehnder modulator 1143 modulates the light in the same manner according to the Q data 1111. By vectral summation of the constellations obtained by the Mach-Zehnder modulators 1142 and 1143, one obtains the QPSK constellation of FIG. 10. For the symbol centers, the phase is on one of the points 131, 132, 133 or 134, depending on the combination of the bits of the I data 1110 and Q data 1111. During the transitions, when the narrow pulse clock is high, the carrier passes through the null point 130. Otherwise, the amplitude is not forced to the null point 130 during transitions. Accordingly, the optical carrier 1103 is PRZ(4)-QPSK modulated light at 56 Gb/s.

The PRZ carving scheme incorporated in the transmitter 1100 is simple, small-sized, cost effective, and stable. It does not rely on an additional optical modulator to carve PRZ dips.

In another exemplary embodiment of the invention, single drive Mach-Zehnder modulators 1142 and 1143 are now nested in the Cartesian modulator 1140. The modulator drivers 1120 and 1121 are now both identical to the modulator driver 900 shown in FIG. 9 and generate respectively the single electrical signals 1112 and 1113 identical to the output 1003 shown in FIG. 10. Depending if 1112 and 1113 are low or high, one of the four phases 131, 132, 133 or 134 is coded on the optical carrier 1103. During transitions, when the narrow pulse clock is high, the electrical signals 1112 and 1113 are in a middle state at the same time, causing the optical carrier to cross the null point 130. During other transitions, the amplitude of the optical carrier 1103 is not forced to null. The optical carrier 1103 is modulated in QPSK format according to the binary data 1101 and the amplitude thereof has PRZ (n) dips carved.

Figure 12:
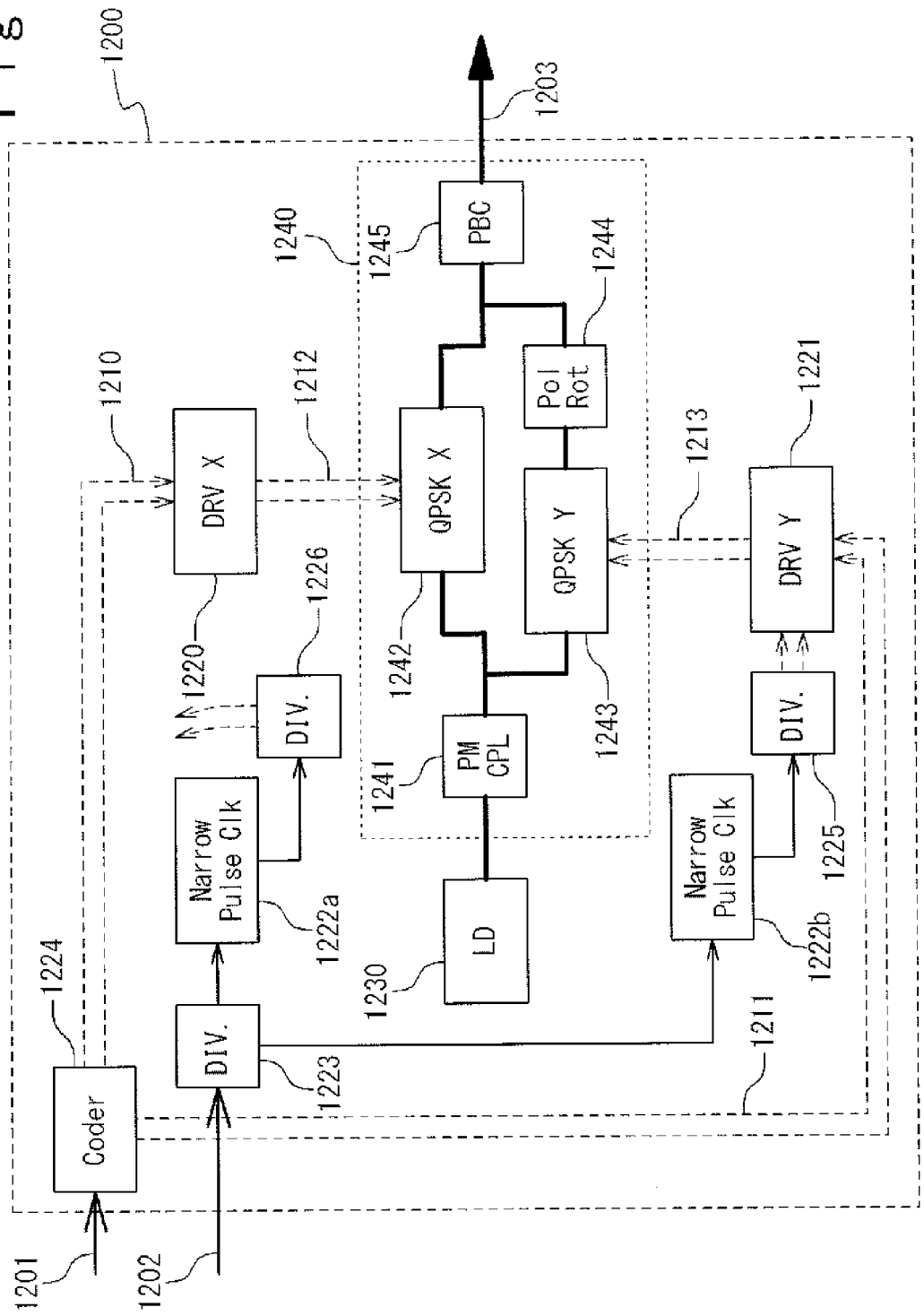
FIG. 12 is a schematic representation of an exemplary configuration of a DP-QPSK transmitter emitting PRZ(n)-DP-QPSK modulated signal according to the present invention.

In another exemplary embodiment, the present invention is incorporated into an optical transmitter shown in FIG. 12. The transmitter 1200 is a PRZ (n)-DP-QPSK transmitter according to the present invention. The transmitter 1200 has an input receiving binary data 1201, and another input receiving a clock 1202 at the baud rate. The numeral 1203 denotes an optical carrier, on which DP-QPSK data are modulated according to binary data 1201. The numeral 1224 denotes a coder which generates two sets of two binary data sequences, each set denoted by the numerals 1210 and 1211, from the binary data 1201, in order to modulate the optical carrier with DP-QPSK format. The binary data sequence set 1210 is a set of I and Q data for the X polarization and the binary data sequence set 1211 is a set of I and Q data for the Y polarization.

The clock 1102 is divided by the divider 1223 and fed to narrow pulse clock generators 1222a and 1222b, which are identical to the narrow pulse clock generator 300 shown in FIG. 3. The output of the narrow pulse clock generator 1222a is a narrow pulse clock of order n and the output of the narrow pulse clock generator 1222b is a narrow pulse clock of order m. The generated narrow pulse clocks are divided by dividers 1225 and 1226, respectively. Modulator drivers 1220 and 1221 each include a set of two modulator drivers 500 shown in FIG. 5. The modulator driver 1220 generates a set of dual electrical signals 1212 of the I and Q data for the polarization X, which set is equivalent to the set of the output signals 503 and 504 shown in FIG. 5. Correspondingly, the modulator driver 1221 generates a set of dual electrical signals 1212 of the I and Q data for the polarization Y, which set is equivalent to the set of the output signals 503 and 504 shown in FIG. 5. The laser diode 1230 generates a CW optical carrier, modulated by a dual polarization Cartesian modulator 1240 including two nested Cartesian QPSK modulators 1242 and 1243, each of which is similar to the Cartesian modulator 1140 shown in FIG. 11, with a polarization maintaining coupler 1241 and a polarization combiner 1245 as well as a polarization rotator 1244. The Cartesian QPSK modulators 1242 and 1243 are both dual driven QPSK modulators so that the sets of the electrical signals 1212 and 1213 drive the QPSK modulators in a dual driving scheme. The optical carrier 1203 is modulated in a DP-QPSK format according to the binary data 1201 and the amplitude thereof has PRZ(n) dips carved for the X polarization and PRZ(m) dips carved for the Y polarization.

Now an example of the operation of the transmitter 1200 is given. The bit rate of the transmitter 1200 is 112 Gb/s, so that the baud rate is 28 Gb/s. The data rate of the binary data 1201 is 112 Gb/s and the frequency of the clock 1202 is 28 GHz. The binary data sequences 1210 and 1211 are respectively sets of the I and Q data for the X and Y polarizations, each data sequence being at 28 Gb/s. The narrow pulse clock generator 1222 generates a narrow pulse clock of order 4, as illustrated on FIG. 4. The narrow pulse clock generator 1224 generates a narrow pulse clock of order 8. The electrical signals 1212 and 1213 are two sets of dual electrical signals at 28 Gb/s each, as illustrated in FIG. 6. Each of the nested QPSK modulators 1242 and 1243 generates a constellation map identical to FIG. 10, of 56 Gb/s PRZ-QPSK in the same manner as the transmitter 1100 shown in FIG. 11. The optical carrier 1203 is modulated in 112 Gb/s polarization multiplexed PRZ(4)-QPSK and PRZ(8)-QPSK.

The PRZ carving scheme incorporated in the transmitter 1200 is simple, small-sized, cost effective, and stable. The transmitter 1200 may be usable with an integrated DP-QPSK modulator 1240. The transmitter 1200 does not rely on an additional optical modulator to carve PRZ dips.

In another exemplary embodiment of the present invention, the QPSK modulators 1242 and 1243 are now single drive QPSK modulators. The modulator drivers 1220 and 1221 now each incorporate two modulator drivers 900 shown in FIG. 9. The modulator driver 1220 generates a set of the single electrical signals 1212 each identical to the output signal 1003 shown in FIG. 10. Correspondingly, the modulator driver 1221 generates a set of the single electrical signals 1213 each identical to the output signal 1003 shown in FIG. 10. The optical carrier 1203 is modulated in a DP-QPSK format according to the binary data 1201 and the amplitude thereof has PRZ(n) dips carved on the X polarization and PRZ(m) dips carved on the Y polarization.

Figure 13:
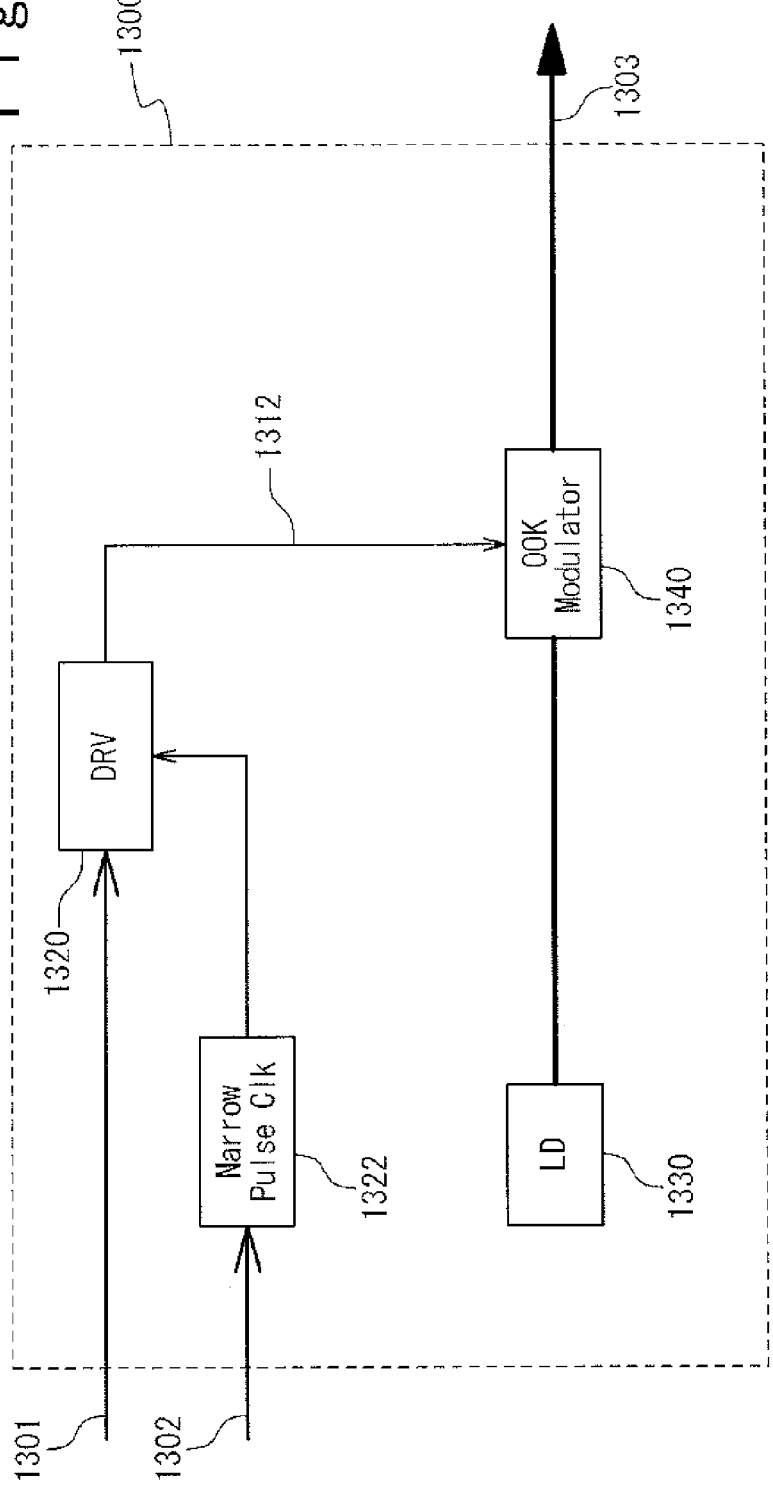
FIG. 13 is a schematic representation of an exemplary configuration of an OOK transmitter emitting PRZ(n)-OOK modulated signal according to the present invention.

In another exemplary embodiment, the present invention is incorporated in an optical transmitter 1300 shown in FIG. 13. The transmitter 1300 is a PRZ(n)-OOK transmitter according to the present invention. The transmitter 1300 receives binary data 1301 on one input and a clock at the baud rate on another input. The numeral 1303 denotes an optical carrier, on which OOK data are modulated according to the binary data 1301. The clock 1302 is fed to a narrow pulse clock generator 1322, which is identical to the narrow pulse clock generator 300 shown in FIG. 3. The output of the pulse clock generator 1322 is a narrow pulse clock of order n. The numeral 1320 denotes a modulator driver which is identical to the modulator driver 700 shown in FIG. 7 and generates an electrical signal 1312 equivalent to the electrical signal 703 shown in FIG. 7. The numeral 1330 denotes a laser diode which generates a CW optical carrier, modulated by an OOK modulator 1340. The electrical signal 1312 drives the OOK modulator 1340 in a single driving scheme, in order to generate a constellation map identical to FIG. 1A, where the null point 100 is attained when the output of the modulator driver 1320 is low and the point 101 is attained when the output of the modulator driver 1320 is high.

When the narrow pulse clock is high, the amplitude of the optical carrier 1303 is forced to zero, and it is not forced to zero otherwise. The optical carrier 1303 is modulated in an OOK format according to the binary data 1301 and the amplitude thereof has PRZ(n) dips carved.

Figure 14:
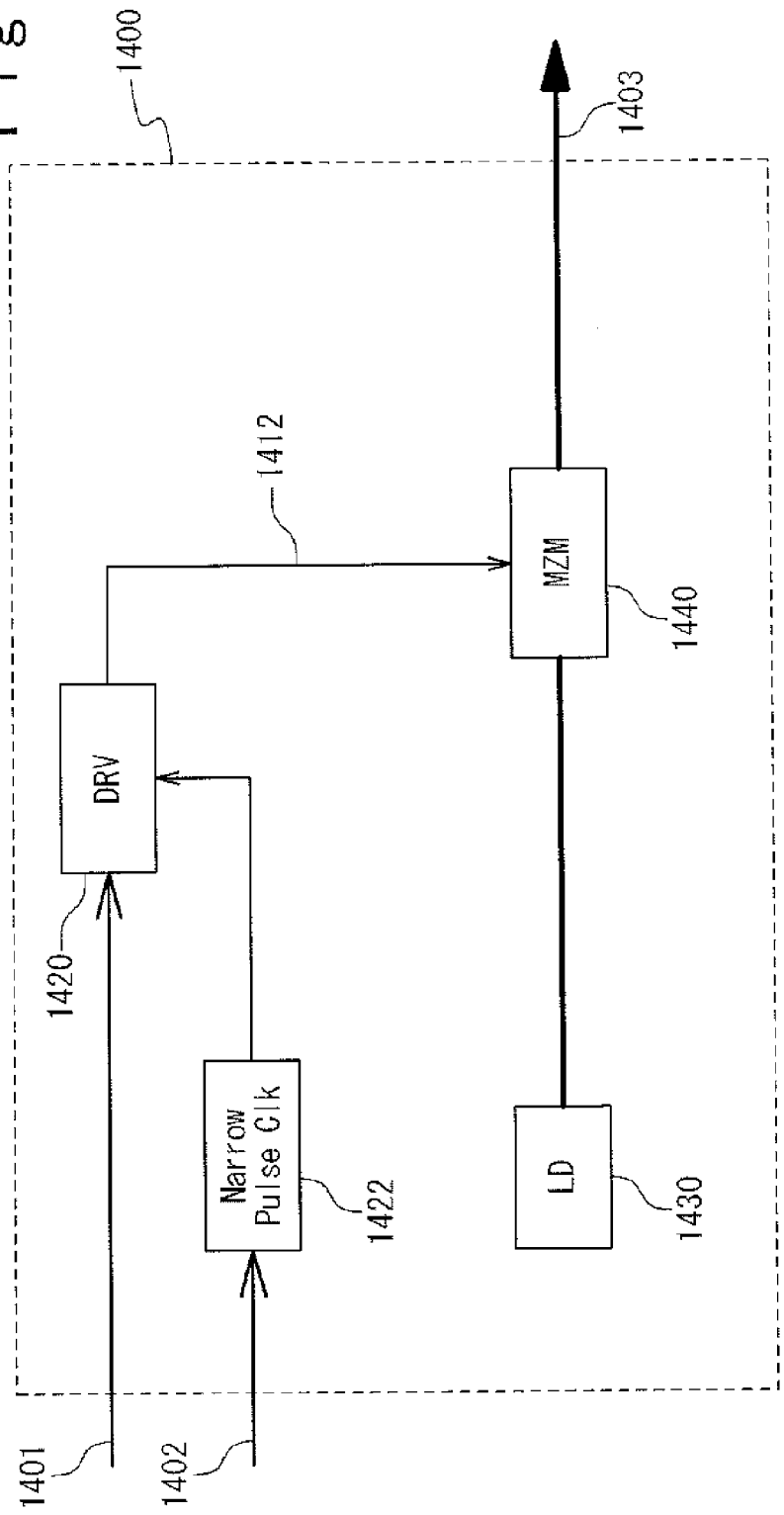
FIG. 14 is a schematic representation of an exemplary configuration of a BPSK transmitter emitting PRZ(n)-BPSK modulated signal according to the present invention.

In another exemplary embodiment, the present invention is incorporated in an optical transmitter 1400 shown in FIG. 14. The transmitter 1400 is a PRZ(n)-BPSK transmitter, which incorporates the present invention. The transmitter 1400 receives binary data 1401 on one input and a clock at the baud rate on another input. The numeral 1403 denotes an optical carrier, on which BPSK data has been modulated according to the binary data 1401. The clock 1402 is fed to the narrow pulse clock generator 1422, which is identical to the narrow pulse clock generator 300 shown in FIG. 3. The output of the narrow pulse clock generator 1422 is a narrow pulse clock of order n. The 1420 denotes a modulator driver which is identical to the modulator driver 500 shown in FIG. 5 and generates a set of dual electrical signals 1412 equivalent to the electrical signals 503 and 504 shown in FIG. 5. The numeral 1430 denotes a laser diode which generates a CW optical carrier, modulated by a Mach-Zehnder modulator 1440. The set of dual electrical signals 1412 drives the Mach-Zehnder modulator 1440 in a dual driving scheme, in order to generate a constellation map identical to FIG. 1B, where the null point 112 is attained when the outputs of the modulator driver 1420 are low and the point 111 is attained when the outputs of the modulator driver 1420 are high. When the narrow pulse clock is high, the amplitude of the optical carrier 1403 is forced to the null 110; it is not forced to null otherwise. The optical carrier 1403 is modulated in BPSK format according to the binary data 1401 and the amplitude thereof has PRZ(n) dips carved.

In another exemplary embodiment, the modulator driver 1420 is identical to the modulator driver 900 shown in FIG. 9, and generates a single electrical signal 1412 equivalent to the electrical signal 903 shown in FIG. 9. The electrical signal 1412 drives the Mach-Zehnder modulator 1440 in a single driving scheme, in order to generate a constellation map identical to FIG. 1B. The optical carrier 1403 is modulated in a PSK format according to the binary data 1401 and the amplitude thereof has PRZ(n) dips carved.

Figure 15:
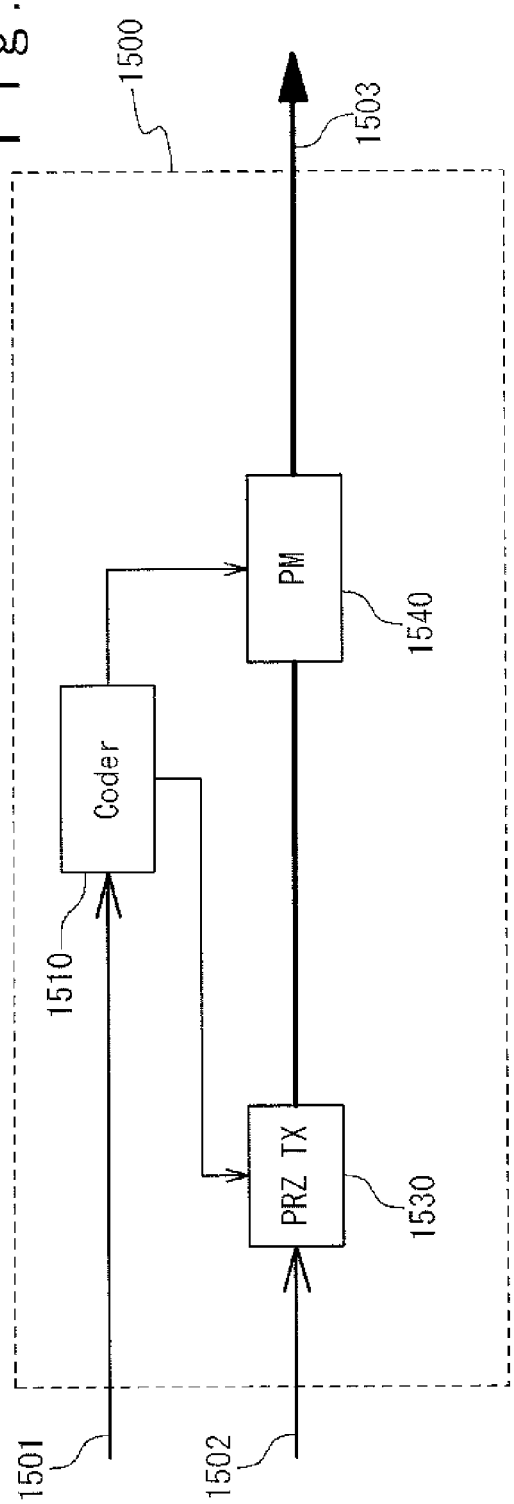
FIG. 15 is a schematic representation of an exemplary configuration of a high order modulation transmitter emitting a PRZ(n) carved signal according to the present invention.

In another exemplary embodiment, the invention is incorporated in an optical transmitter 1500 shown in FIG. 15. The transmitter 1500 is an xPSK transmitter including an optical subassembly 1530, emitting light modulated on a PRZ (n)-QPSK format, such as the optical transmitter 1100 shown in FIG. 11. The optical transmitter 1500 includes a phase modulator 1540. The optical transmitter 1500 receives binary data 1501 and a clock 1502 with the baud rate of the optical subassembly 1530. As explained in Seimetz et al. (ECOC 2007, paper 08.3.4), where a QPSK Cartesian modulator is followed by a phase modulator to generate an 8PSK, the optical transmitter 1500 is a PRZ(n)-8PSK transmitter.

In another exemplary embodiment, the optical subassembly 1530 is a PRZ(n)-BPSK transmitter as explained by Le Taillandier de Gabory et al. (OFC 2009, paper JWA42), where a PSK modulator is followed by a phase modulator to generate a QPSK signal in a serial modulation scheme. In this case, the optical transmitter 1500 operates a PRZ(n)-QPSK transmitter.

In another exemplary embodiment, the optical subassembly 1530 includes a Cartesian modulator as the transmitter 1100 shown in FIG. 11. As explained by Zhou et al. (OFC 2009, paper OWG3) where a Cartesian modulator is followed by a phase modulator to generate a 8QAM signal in a serial modulation scheme, the 1500 optical transmitter 1500 operates as a PRZ(n)-8QAM transmitter.

In another exemplary embodiment, the present invention is incorporated in an optical transmitter 1600 shown in FIG. 16. The optical transmitter 1600 is a PRZ(n)-QAM transmitter according to the present invention. The optical transmitter 1600 receives binary data 1601 on one input and a clock 1602 at the symbol rate on another input. The numeral 1603 denotes an optical carrier, on which xQAM data has been modulated according to the binary data 1601. The clock 1602 is fed to a narrow pulse clock generator 1622, which is identical to the narrow pulse clock generator 300 shown in FIG. 3. The output of the narrow pulse clock generator 1622 is a narrow pulse clock of order n. The numeral 1640 denotes a QAM modulator identical to the QAM modulator described by Sano et al. (ECOC 2009, paper PDP 2.2), where 64QAM signal is generated by nested Cartesian modulators. The modulator driver 1620 includes two modulator drivers 500 shown in FIG. 5 for each nested Cartesian modulator in the QAM modulator 1640, one for the I data and one for the Q data and generates a set of dual electrical signals equivalent to the electrical signals 503 and 504 shown in FIG. 5. The numeral 1612 groups all the sets of dual electrical signals generated by the modulator driver 1620. The optical carrier 1603 is modulated as PRZ(n)-xQAM by the QAM modulator 1640. The laser diode 1630 generates a CW optical carrier, modulated by the QAM modulator 1640. The electrical signals 1612 drive the QAM modulator 1640 in a dual driving scheme. When the narrow pulse clock is high, the amplitude of the optical carrier 1603 is forced to the null; it is not forced to null otherwise. The optical carrier 1603 is modulated in xQAM format according to the binary data 1601 and the amplitude thereof has PRZ(n) dips carved.

Although the invention has been particularly shown and described with reference to exemplary embodiments thereof, the invention is not limited to these embodiments. It would be understood by those skilled in the art that various changes in form and details may be made therein without departing from the spirit and scope of the present invention as defined by the claims.

The invention claimed is:

1. A pseudo-return-to-zero modulator, comprising:
   a narrow pulse clock generator generating a narrow pulse clock of order n, where one of levels occupies half a symbol period and the other level occupies (n−1) plus half a symbol period, n being equal to or more than two;
   a modulator driver generating an electrical signal in response to binary data and said narrow pulse clock; and
   an optical modulator modulating an optical carrier in response to said electrical signal so that said modulated optical carrier is in a PRZ(n) format.

2. The pseudo-return-to-zero modulator according to claim 1, wherein said modulator driver generates said electrical signal, so that said optical carrier is forced to null in response to said narrow pulse clock being set to said one of levels.

3. The pseudo-return-to-zero modulator according to claim 2, wherein said modulated optical carrier is in a PRZ-QPSK format.

4. The pseudo-return-to-zero modulator according to claim 2, wherein said modulated optical carrier is in a PRZ-DP-QPSK format.

5. The pseudo-return-to-zero modulator according to claim 2, wherein said modulated optical carrier is in a PRZ-OOK format.

6. The pseudo-return-to-zero modulator according to claim 2, wherein said modulated optical carrier is in a PRZ-xQAM format, where x is equal to or greater than 4.

7. The pseudo-return-to-zero modulator according to claim 1, wherein said optical modulator is driven in a dual scheme.

8. The pseudo-return-to-zero modulator according to claim 7, wherein said modulated optical carrier is in a PRZ-QPSK format.

9. The pseudo-return-to-zero modulator according to claim 7, wherein said modulated optical carrier is in a PRZ-DP-QPSK format.

10. The pseudo-return-to-zero modulator according to claim 7, wherein said modulated optical carrier is in a PRZ-OOK format.

11. The pseudo-return-to-zero modulator according to claim 7, wherein said modulated optical carrier is in a PRZ-xQAM format, where x is equal to or greater than 4.

12. The pseudo-return-to-zero modulator according to claim 1, wherein said optical modulator is driven in a single scheme.

13. The pseudo-return-to-zero modulator according to claim 12, further comprising a phase modulator,
    wherein said modulated optical carrier is in a PRZ-QPSK format, and
    wherein said phase modulator generates a resultant optical carrier modulated in a PRZ-xPSK format where x is equal or greater than 2, from said modulated optical modulator.

14. The pseudo-return-to-zero modulator according to claim 12, wherein said modulated optical carrier is in a PRZ-QPSK format.

15. The pseudo-return-to-zero modulator according to claim 12, wherein said modulated optical carrier is in a PRZ-DP-QPSK format.

16. The pseudo-return-to-zero modulator according to claim 12, wherein said modulated optical carrier is in a PRZ-OOK format.

17. The pseudo-return-to-zero modulator according to claim 4, wherein said modulated optical carrier is in a PRZ-xQAM format, where x is equal to or greater than 4.

18. The pseudo-return-to-zero modulator according to claim 1, wherein said modulated optical carrier is in a PRZ-QPSK format.

19. The pseudo-return-to-zero modulator according to claim 1, wherein said modulated optical carrier is in a PRZ-DP-QPSK format.

20. The pseudo-return-to-zero modulator according to claim 1, wherein said modulated optical carrier is in a PRZ-OOK format.

21. The pseudo-return-to-zero modulator according to claim 1, wherein said modulated optical carrier is in a PRZ-BPSK format.

22. The pseudo-return-to-zero modulator according to claim 1, wherein said modulated optical carrier is in a PRZ-xQAM format, where x is equal to or greater than 4.

* * * * *

UNITED STATES PATENT AND TRADEMARK OFFICE
CERTIFICATE OF CORRECTION

PATENT NO. : 8,837,947 B2  
APPLICATION NO. : 13/131965  
DATED : September 16, 2014  
INVENTOR(S) : Emmanuel Le Taillandier De Gabory Page 1 of 1

It is certified that error appears in the above-identified patent and that said Letters Patent is hereby corrected as shown below:

In the Specification  
Column 1, Line 6: Delete "Feb. 20, 2010," and insert -- Jan. 20, 2010, --

Signed and Sealed this  
Sixth Day of January, 2015

Michelle K. Lee  
*Deputy Director of the United States Patent and Trademark Office*